April 3, 1956
M. BUSTO
2,740,571
MEASURING AND DISPENSING DEVICE
FOR MAKING VARIED-LAYER DRINKS
Filed March 29, 1955
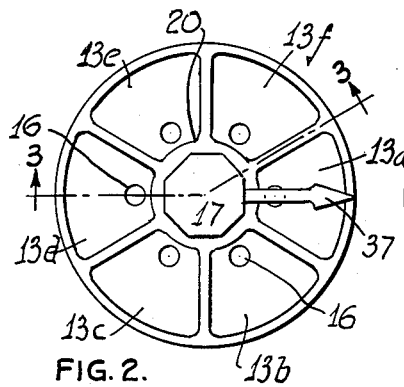
FIG. 2.
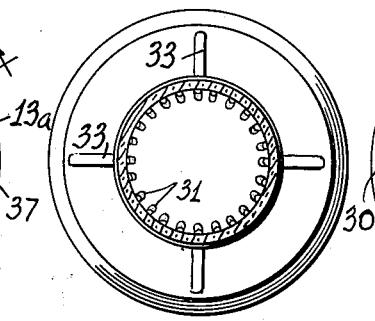
FIG. 4.
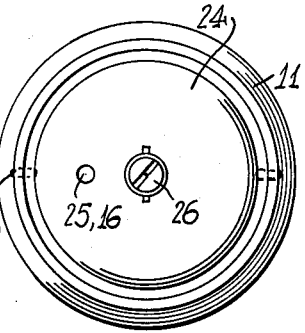
FIG. 5.
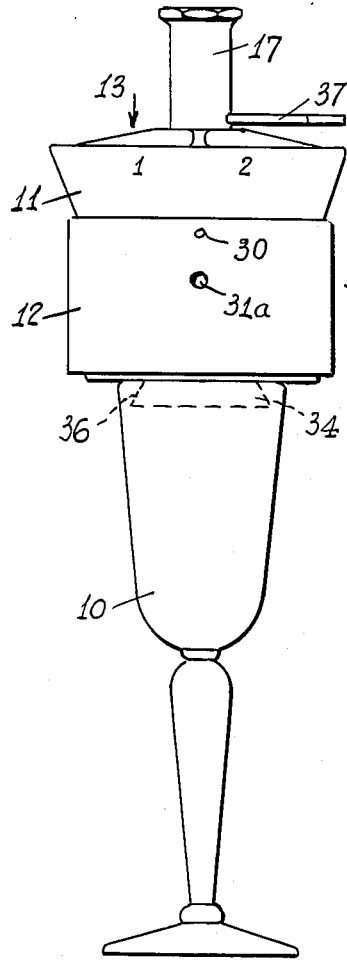
FIG. 1.
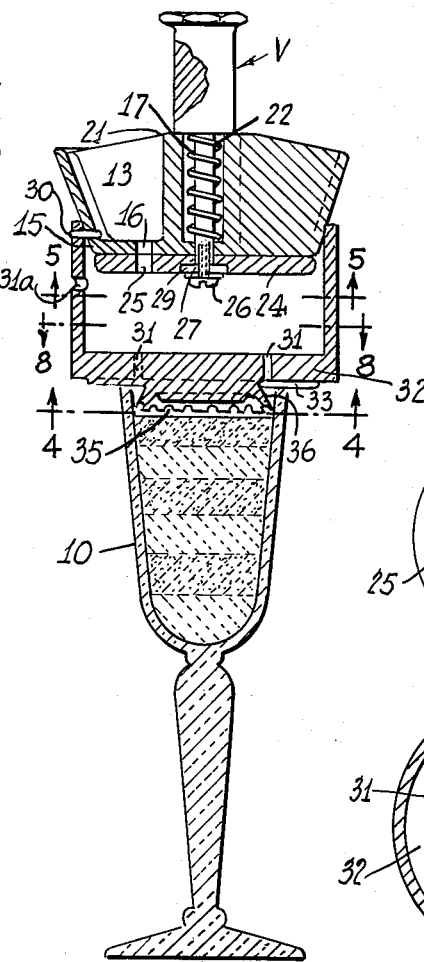
FIG. 3.
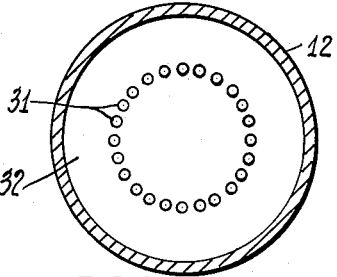
FIG. 6.
FIG. 7.
FIG. 8.
INVENTOR.
MARIO BUSTO.
BY
ATTORNEY.

United States Patent Office 2,740,571
Patented Apr. 3, 1956

2,740,571

MEASURING AND DISPENSING DEVICE FOR MAKING VARIED-LAYER DRINKS

Mario Busto, Bronx, N. Y.

Application March 29, 1955, Serial No. 497,689

12 Claims. (Cl. 226—19)

This invention relates to a device for producing a liqueur drink comprising a concoction of liqueurs arranged in the cordial glass according to their respective specific gravities. Such drinks are conventionally known as "Pousse Cafe" or "Rainbow Cordial." The alcoholic combination provides a very colorful drink.

Heretofore, time and a steady hand were required to make the varied-layer drink. Therefore, such drinks were usually expensive and because of the complexity and requirements for making the drink, usually shunned by the bar tender.

It is, therefore, an object of the present invention to provide an efficient, simple, practical and inexpensive measuring and dispensing device for making varied-layer cordials which overcomes the above-mentioned difficulties and disadvantages.

It is a further object of the present invention to provide a measuring and dispensing device for producing such drinks as the "Pousse Cafe" or the "Rainbow Cordial" which device may be applied directly to the cordial glass which is to receive the contents of such a drink.

These and other objects and advantages of the invention will appear as the description proceeds, it being understood however, that it is not intended that the invention be limited to the exact details described herein which illustrate the production of a satisfactory example of many which may be obtained as a result of the knowledge gained through or gleaned from an understanding of the invention; and it is further intended that there be included as part of the invention all such obvious changes and modifications thereof as would occur to a person skilled in the art to which this invention pertains and as would fall within the scope of the following claims.

In the drawings:

Fig. 1 is an elevational view of a measuring and dispensing device for making varied-layer cordials, according to the invention and shown applied to a cordial glass;

Fig. 2 is a top view thereof;

Fig. 3 is a sectional view of Fig. 1 along lines 3—3 of Fig. 2;

Fig. 4 is a bottom view of the said device along line 4—4 of Fig. 3;

Fig. 5 is a bottom view of the upper receptacle along 5—5 of Fig. 3;

Fig. 6 is a bottom view of a disc attached to the valve stem of Fig. 7;

Fig. 7 is a side view of the valve stem shown partly in section;

Fig. 8 is a sectional view taken along 8—8 of Fig. 3.

The measuring and dispensing device for making varied-layer cordials or the "Pousse Cafe" in one of its general aspects comprises two superimposed receptacles, upper and lower respectively, the upper receptacle of which being divided into a plurality of compartments for receiving liqueurs or cordials having different specific gravities and having a perforated bottom wall, there being a perforation for each compartment, a rotatable valve arrangement having its axis in a central bore of the upper receptacle, and to which is fixed at the lower end thereof and adjacent the bottom wall of the other of the upper receptacle, a disc having a single perforation adapted to register respectively with the perforation in the bottom wall of the upper receptacle when the said valve is rotated, the lower receptacle having its bottom wall provided with a plurality of perforations and a depending preferably serrated or fluted flared member adapted to project within the mouth of the cordial glass upon which it is made to rest.

Referring now more particularly to the drawings, there is disclosed a preferred form of measuring and dispensing device for making varied-layer cordials in a cordial glass 10. This device comprises two superimposed receptacles respectively 11, 12, upper and lower. Upper receptacle 11 is divided into a plurality of compartments 13a to 13f inclusive, for receiving therein the liqueurs having different specific gravities. Compartments 13a to 13f may carry suitable indicia or numbers such as 1 to 16 on its outer wall arranged according to the type and/or specific gravity of the liquid. Upper receptacle 11 has a perforated bottom wall 15, there being provided therein a perforation 16 for each compartment, and also a central bore 17 through which passes a valve stem 18 having an enlarged head 19 which rests on the top base 20 of the substantially cylindrical wall 21 surrounding the bore 17. Circumposing stem 18 is a spiral spring 22, one end of which abuts against the lower face 23 of head 19 and the other end of which abuts against the bottom of bore 17.

Beneath the perforated bottom 15 of upper receptacle 11 and substantially the diameter of the said bottom there is located a disc 24 having a single perforation 25, said disc 24 being fixed to rotate with valve stem 18, 19, by such means as a screw 26, the shank 27 of which is fixedly received in the recess 28 at the lower end of stem 18. A washer 29 is received in a central countersunk recess of disc 24. Perforation 25 of rotatable disc 24 is adapted to register respectively with the perforation 16 of compartments 13 when valve stem 18, 19, is rotated. Valve stem 18, 19, spring 22 and disc 24 constitute a valve generally indicated by the letter V to control the flow of liquid for upper receptacle 11 to lower receptacle 12 upon which upper receptacle 11 rests or is fixed as by means of pins 30. Lower receptacle 12 is provided with one or more vents 31a in its preferably cylindrical side wall, and a plurality of circumferentially arranged perforations or openings 31 in its bottom wall 32. Projecting from the lower face of bottom wall 32 are a plurality of radial fins or spacers 33, the purpose of which is to act as rests and provide air spaces between the rim of glass 10 and the device. Depending from bottom 32 of the lower receptacle 12 is a preferably serrated or fluted flared member 34 having the grooves, flutes or serrations 35 in its tapered or flared wall 36. Member 34 is sized so as to substantially snugly project within the mouth of the glass 11.

As seen in Fig. 3, perforations 31 are arranged on the member 34 made of such size that perforations 31 are just about above or at the upper narrow circular edge of fluted or serrated tapered member 34, so that the liqueur in passing through the perforations 31 will slowly flow down the flutes or serrations 35 and trickle down the side wall of the glass. Valve head 19 is provided with a pointer or index finger 37 so fixed thereto that when it is midway of a compartment 13, as seen in Fig. 2, the perforation or opening 25 is disc 24 will register with the perforations 16 of the said compartment 13.

The device is placed upon the mouth of the glass with the pointer 37 not in midway position over a compartment. The liqueurs in amounts of about ⅙ oz. each are poured into the compartments sequentially in order of their specific gravities, starting with say, compartment (13a with the pointer 37 off midway position) and following a clock-wise direction.

To make a colorful and alcoholic combination or drink, such as, for example, a standard "Pousse Cafe" the following recipe is suggested.

⅙ oz. Grenadine (Red) in compartment 13a.
⅙ oz. Creme de Cacao (Brown) in compartment 13b.
⅙ oz. Marchino (White) in compartment 13c.
⅙ oz. Green Creme de Menthe (Green) in compartment 13d.
⅙ oz. Creme Yvette (Violet) in compartment 13e.
⅙ oz. Brandy or Rum (Amber) in compartment 13d.

After the aforementioned liqueurs have been poured into the compartments, valve V is rotated by gripping it between the thumb and forefinger of a hand until pointer 37 moves to a midway position over compartment 13a as seen in Fig. 2, which brings opening or perforation 25 of disc 24 into register with opening or perforation 16. The liqueur will then flow from compartment 13a through registered openings 16, 25 into lower receptacle 12, then through perforations 31 in the bottom wall 32 of lower receptacle 12 down the tapered fluted or serrated wall 36 of member 34, and then trickle down the inner wall or side of the glass 11. After compartment 13a has emptied, valve V is again rotated until pointer 37 assumes a position midway of compartment 13b and after compartment 13b has emptied, valve V is further rotated repeating the aforementioned process, until all of the compartments have been emptied, at which time varied-color liqueurs will have arranged themselves in layers in the glass according to their specific gravity. The device is then raised from the glass.

It is understood that any suitable type of valve means may be employed and that variations may be made in the lower receptacle, so long as the intent and purpose of the invention are maintained. From the foregoing it is evident, that there has been provided by this invention a very practical, simple and efficient measuring and dispensing device for varied-color drinks.

Although the drawing and the above specification disclose the best mode in which I have contemplated embodying my invention, I desire in no way to be limited to details of such disclosure, for in the further practical application of my invention many changes in the form and proportion may be made as circumstances require or experience suggests without departing from the spirit of the invention within the scope of the appended claims.

Having thus described my invention what I claim as new and desire to secure by Letters Patent is:

1. A dispensing device for making a varied-layer drink, comprising a member having a plurality of perforations, a guide depending from the bottom of said member, said guide having a wall disposed below said perforations, a receptacle disposed above said perforations, said receptacle being divided into a plurality of compartments, each of said compartments having a perforation in the bottom of said receptacle, and a rotatable valve disposed between said bottom of said receptacle and said perforations in said member, said valve having a perforation adapted to register respectively with the perforations in said bottom of said receptacle as said valve is rotated.

2. A dispensing device according to claim 1, said valve having a valve stem projecting from said receptacle for facilitating rotation of said valve.

3. A dispensing device according to claim 1, said valve comprising a disc having said perforation adapted to register respectively with the perforations in said bottom of said receptacle as said valve is rotated and a valve stem fixed to said disc and projecting from said receptacle for facilitating rotation of said valve.

4. A dispensing device according to claim 3, wherein said receptacle has a central bore and said valve stem is located in said bore and projects upwardly therefrom.

5. A dispensing device according to claim 4, wherein said wall of said guide is tapered.

6. A dispensing device according to claim 4, wherein said wall of said guide is tapered and provided with serrations.

7. A dispensing device according to claim 1, wherein said wall of said guide is tapered towards said member and is provided with flutes.

8. A dispensing device according to claim 1, wherein said member comprises a receptacle the bottom of which is provided with said plurality of perforations.

9. A dispensing device according to claim 1, wherein said valve comprises a disc having said perforation adapted to register respectively with the perforations in said bottom of said receptacle as said valve is rotated and a valve stem fixed to said disc and projecting from said receptacle for facilitating rotation of said valve, and said member comprises a receptacle the bottom of which is provided with said plurality of perforations.

10. A dispensing device according to claim 9, wherein said receptacle has a central bore and said valve stem is located in said bore and projects upwardly therefrom.

11. A dispensing device according to claim 10, wherein said wall of said guide is tapered towards said member and is provided with flutes.

12. A dispensing device according to claim 1, including means for indicating when the perforation in said valve is in register with a perforation of a compartment in said receptacle.

No references cited.